United States Patent
Shimogawa

(10) Patent No.: US 8,352,942 B2
(45) Date of Patent: Jan. 8, 2013

(54) VIRTUAL-MACHINE CONTROL APPARATUS AND VIRTUAL-MACHINE MOVING METHOD

(75) Inventor: Kenichirou Shimogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 460 days.

(21) Appl. No.: 12/539,332

(22) Filed: Aug. 11, 2009

(65) Prior Publication Data

US 2009/0300614 A1 Dec. 3, 2009

Related U.S. Application Data

(63) Continuation of application No. PCT/JP2007/056488, filed on Mar. 27, 2007.

(51) Int. Cl.
*G06F 9/455* (2006.01)

(52) U.S. Cl. .......................................................... 718/1

(58) Field of Classification Search .................. 718/1
See application file for complete search history.

(56) References Cited

U.S. PATENT DOCUMENTS

| | | | | |
|---|---|---|---|---|
| 7,203,944 | B1 * | 4/2007 | van Rietschote et al. ..... | 718/104 |
| 7,313,793 | B2 | 12/2007 | Traut et al. | |
| 7,571,446 | B2 * | 8/2009 | Seki et al. ...................... | 719/330 |
| 2002/0016812 | A1 | 2/2002 | Uchishiba et al. | |
| 2005/0132362 | A1 | 6/2005 | Knauerhase et al. | |
| 2005/0160413 | A1 * | 7/2005 | Broussard et al. ............ | 717/148 |
| 2006/0069761 | A1 * | 3/2006 | Singh et al. ................... | 709/222 |
| 2007/0136402 | A1 * | 6/2007 | Grose et al. ................... | 707/206 |
| 2008/0059747 | A1 * | 3/2008 | Burckart et al. .............. | 711/167 |
| 2008/0104587 | A1 * | 5/2008 | Magenheimer et al. .......... | 718/1 |
| 2008/0141264 | A1 * | 6/2008 | Johnson ........................ | 718/105 |
| 2008/0168457 | A1 * | 7/2008 | Accapadi et al. ............. | 718/104 |

FOREIGN PATENT DOCUMENTS

| | | |
|---|---|---|
| JP | A 5-204760 | 8/1993 |
| JP | A 6-95899 | 4/1994 |
| JP | 2002-41304 | 2/2002 |
| JP | A 2004-133894 | 4/2004 |
| WO | WO 2005/062177 A2 | 7/2005 |

OTHER PUBLICATIONS

Masaki Tatezono et al., "MPI Environment with Load Balancing using Virtual Machine," IEICE Technical Report, Jul. 28, 2005.
"VMware VMotion" Live migration of virtual machines without service interruption, [online], VMware, Inc., retrieved on Mar. 6, 2007: http://www.vmware.com/pdf/vmotion_datasheet.pdf.

* cited by examiner

*Primary Examiner* — Meng An
*Assistant Examiner* — Blake Kumabe
(74) *Attorney, Agent, or Firm* — Greer, Burns & Crain, Ltd.

(57) ABSTRACT

A virtual-machine control program includes an operational-status inquiry unit that inquires of another machine about a memory usage status of virtual machines realized on another machine; a swapping-target selecting unit that selects a virtual machine capable of being swapped for a virtual machine realized on a machine from among the virtual machines realized on another machine based on information obtained by the operational-status inquiry unit; and a swapping performing unit that swaps the virtual machine realized on the machine for the virtual machine selected by the swapping-target selecting unit. The virtual-machine control program enables to move the virtual machine to another machine without preparing a free space in advance.

12 Claims, 10 Drawing Sheets

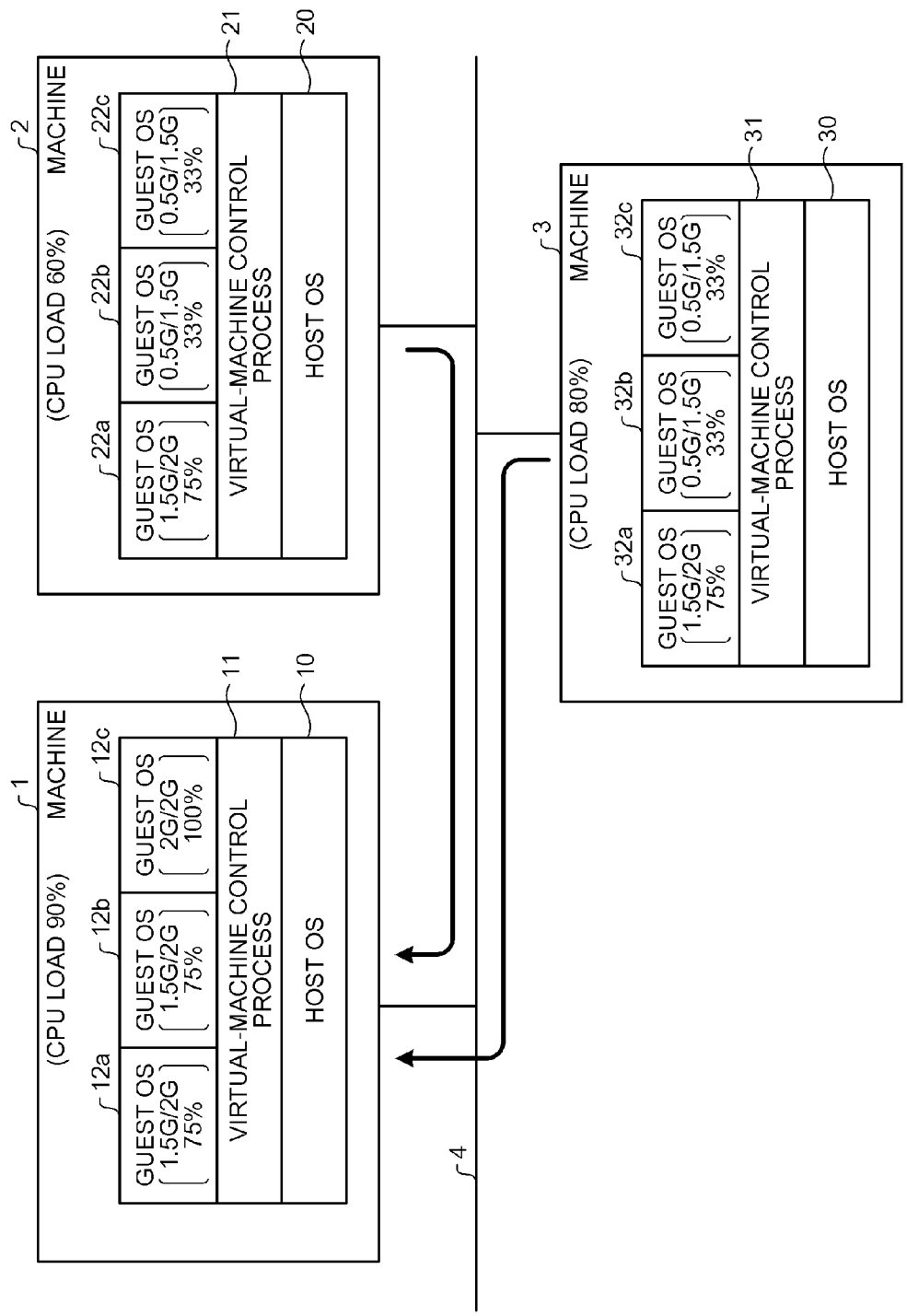

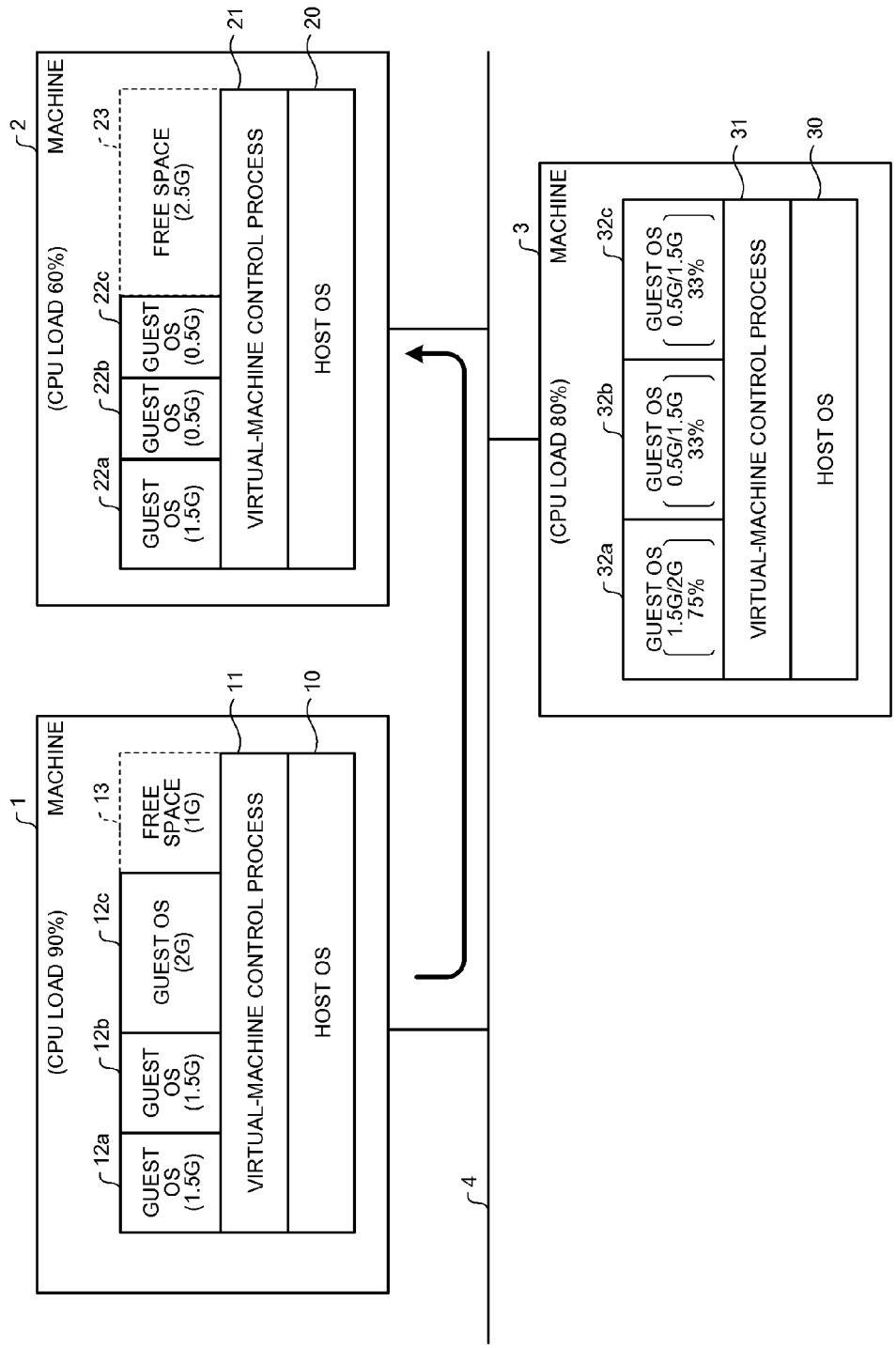

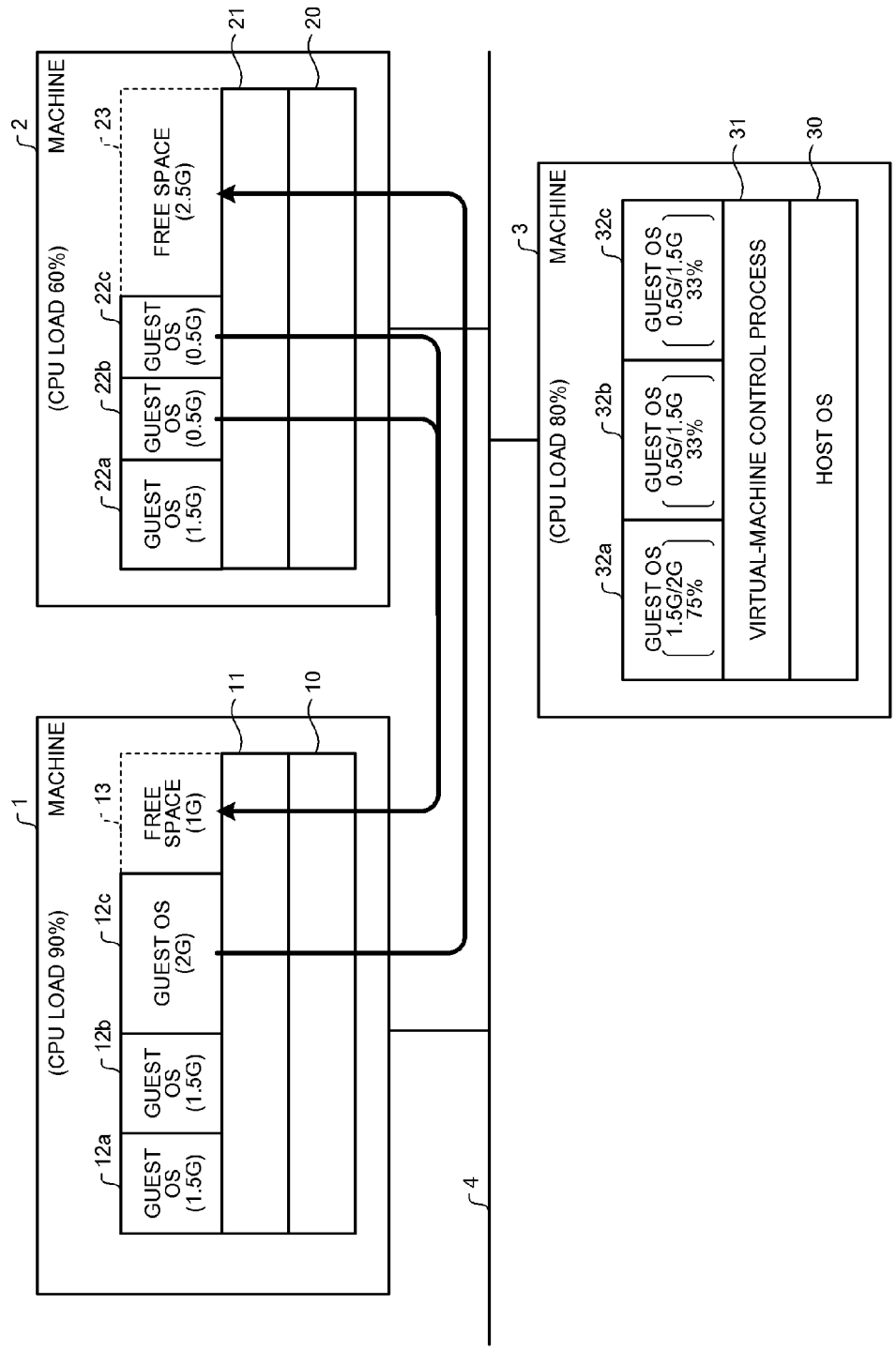

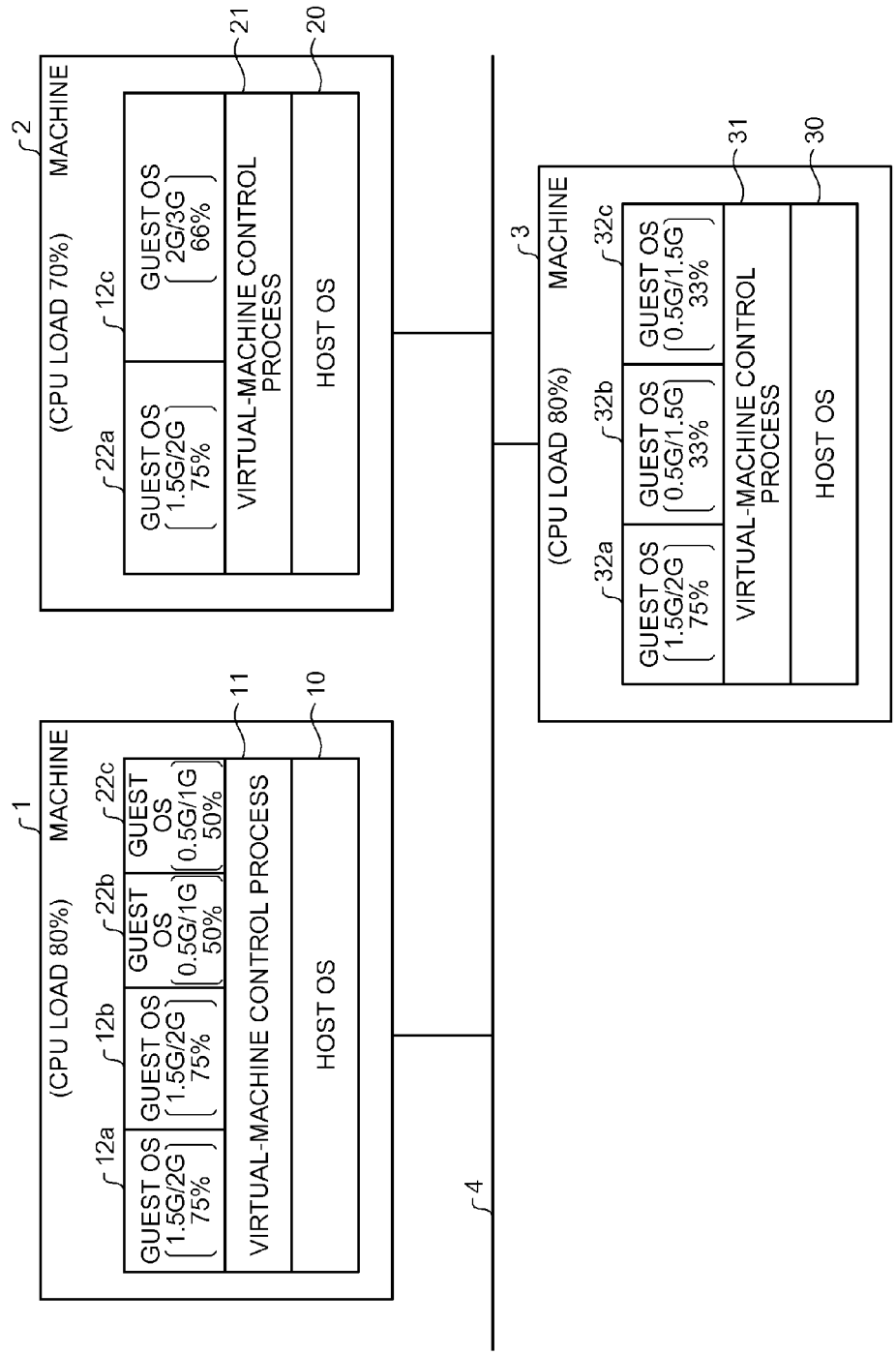

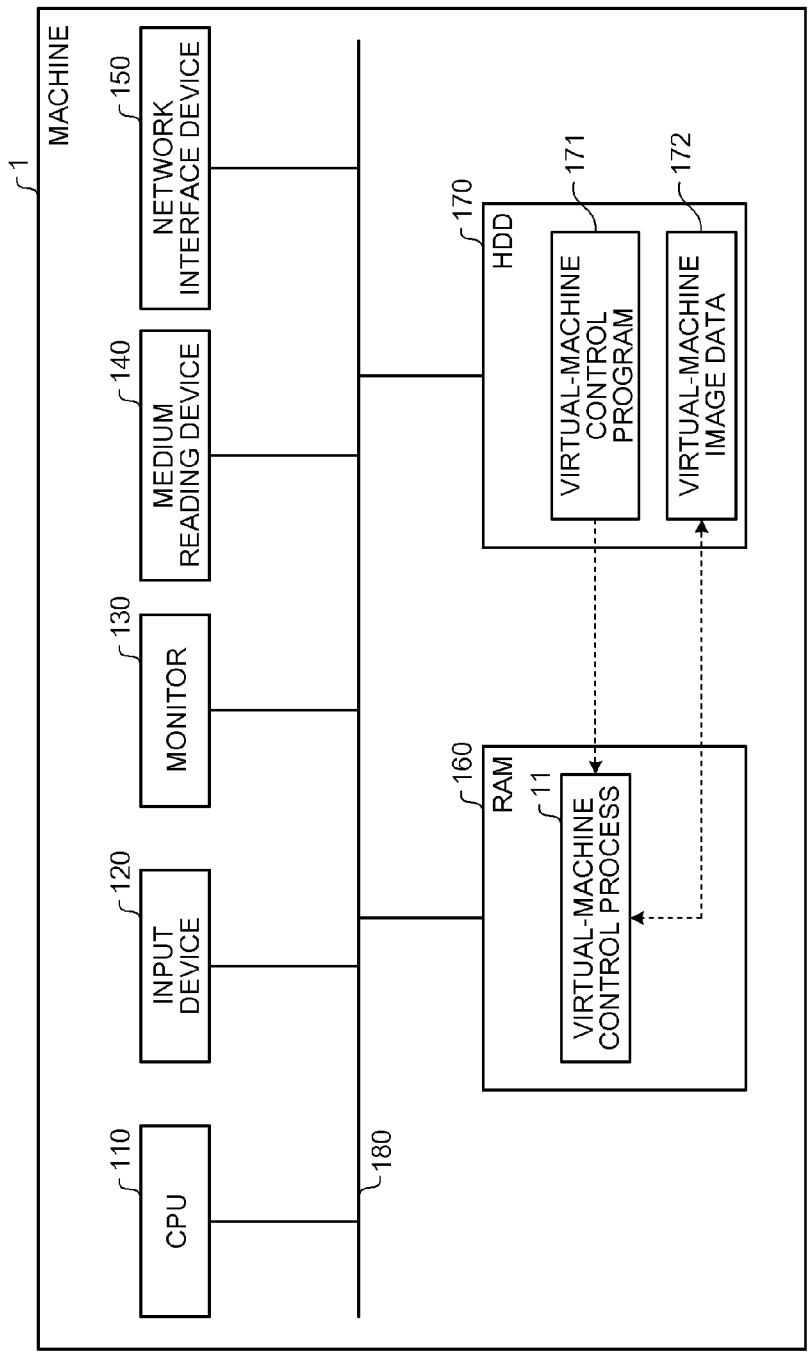

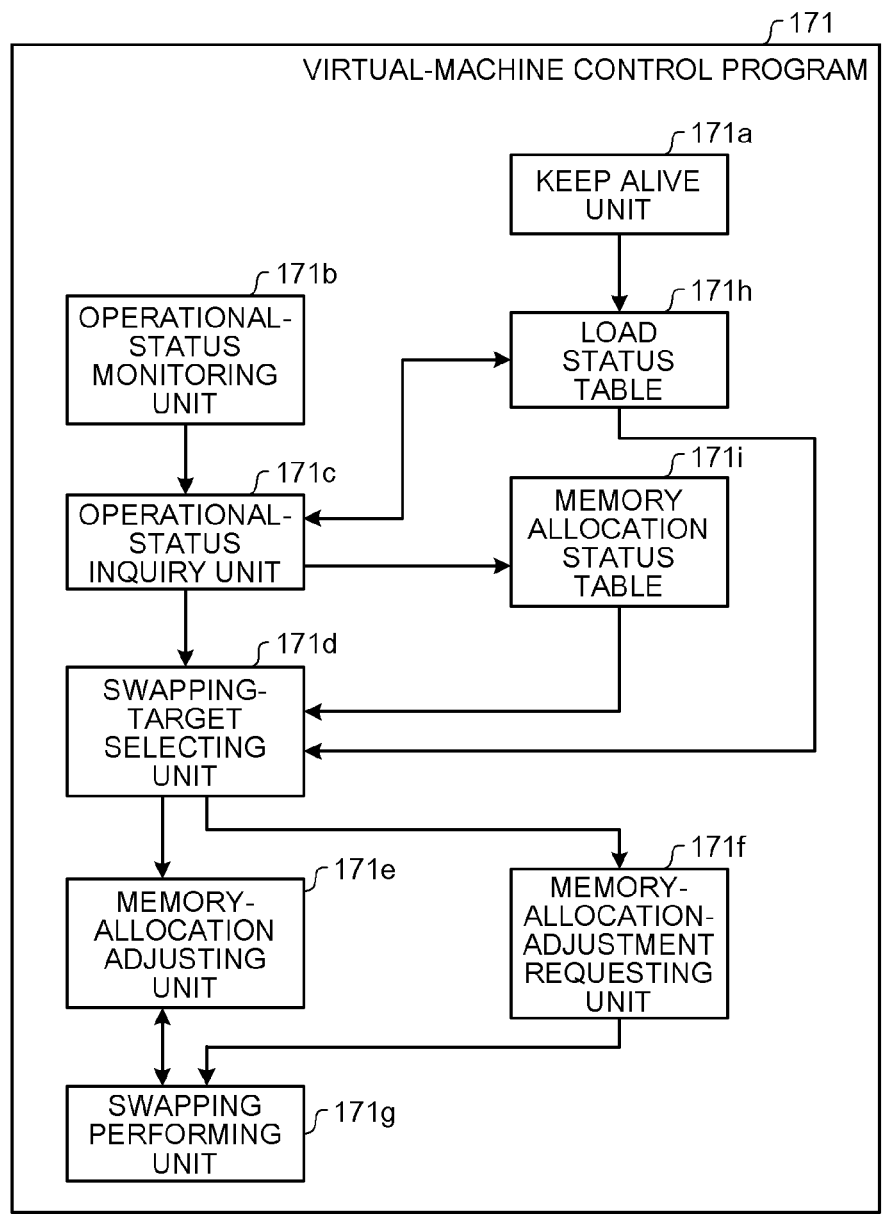

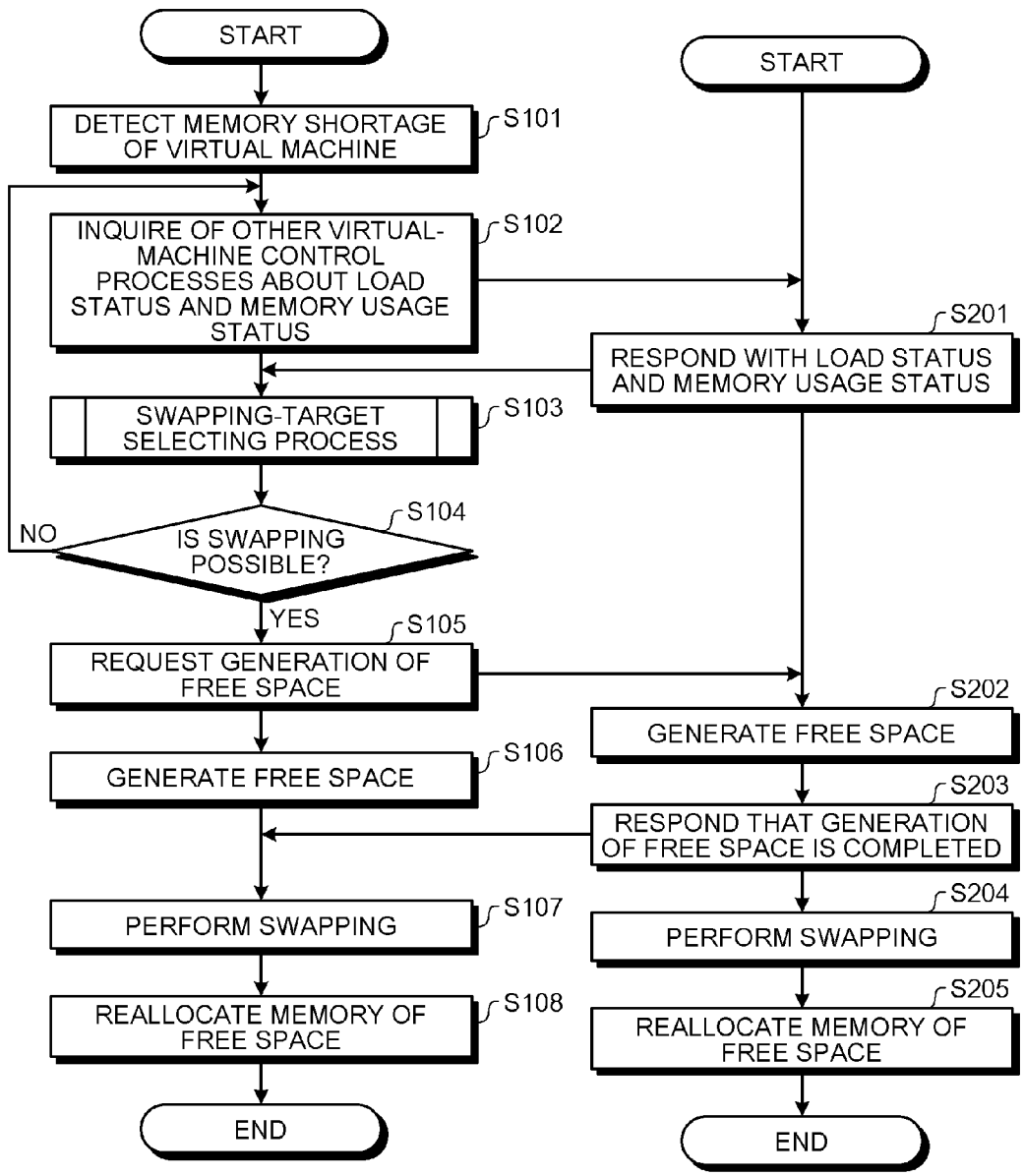

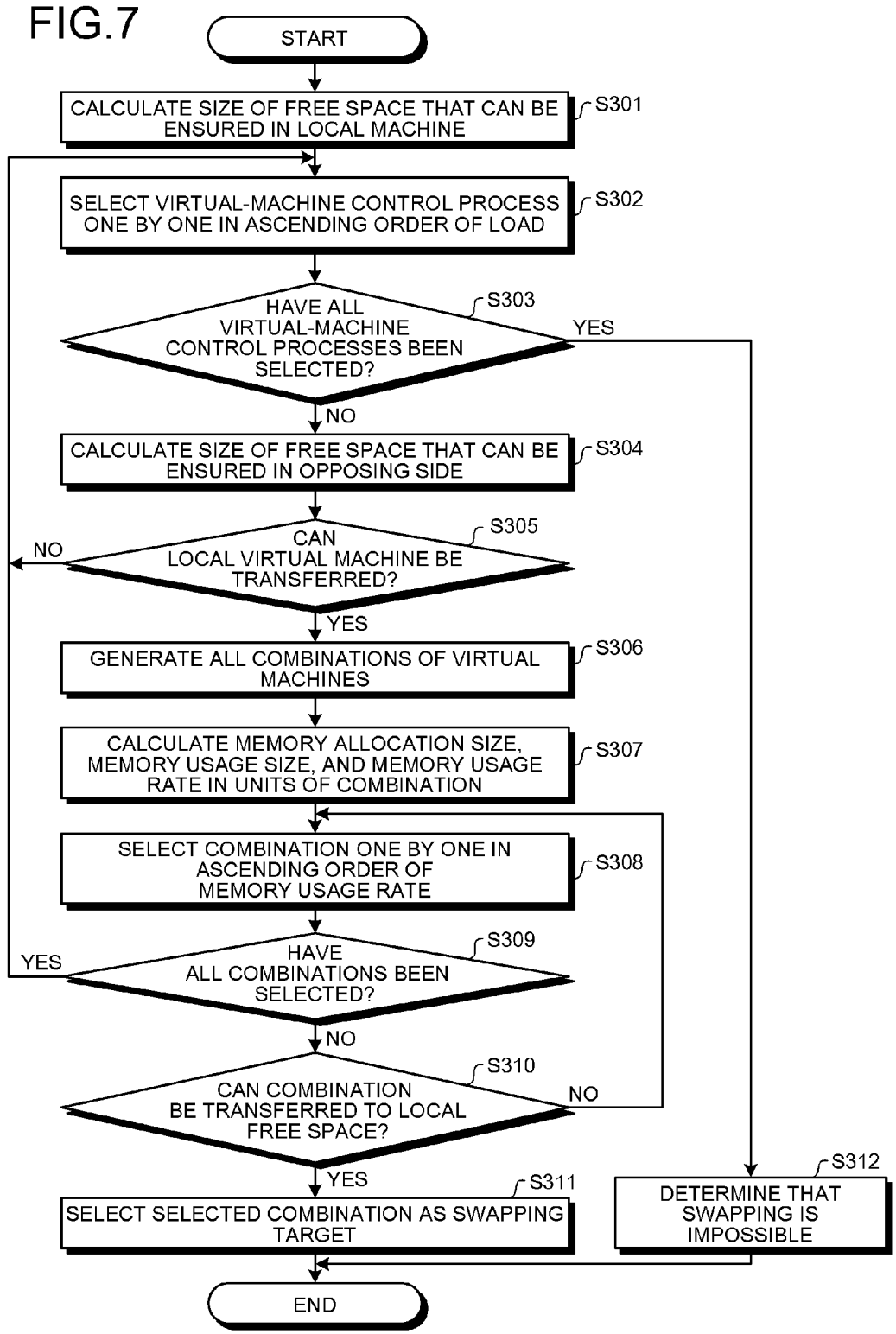

VIRTUAL-MACHINE CONTROL APPARATUS AND VIRTUAL-MACHINE MOVING METHOD

CROSS-REFERENCE TO RELATED APPLICATION(S)

This application is a continuation of PCT international application Ser. No. PCT/JP2007/056488 filed on Mar. 27, 2007 which designates the United States, the entire contents of which are incorporated herein by reference.

FIELD

The embodiments discussed herein are directed to a computer readable storage medium containing a virtual-machine control program, a virtual-machine control system, and a virtual-machine moving method that is performed in the virtual-machine control system.

BACKGROUND

When memory shortage occurs in a virtual machine realized on a machine, a technique is known to solve the memory shortage by swapping unused memory between virtual machines on the same machine (for example, Japanese Laid-open Patent Publication No. 05-204760). Moreover, a hot migration technique is known to solve the memory shortage, in which a virtual machine in which the memory shortage occurs is moved to another machine having sufficient memory while keeping the virtual machine in operation.

The hot migration technique is superior than the technique disclosed in Japanese Laid-open Patent Publication No. 05-204760 because the hot migration technique can be used not only for solving the memory shortage of the virtual machine but also for solving shortage of other resources such as a computing power of a central processing unit (CPU) and a communication capacity of a network.

However, for moving a virtual machine between machines by using the hot migration technique, a free space enough to store the virtual machine to be moved needs to be prepared in advance in a memory of a destination machine. Therefore, an extremely large memory needs to always be allocated in an unused state, which leads low use efficiency of resources.

SUMMARY

According to an aspect of the invention, a computer readable storage medium contains instructions for realizing a virtual machine on a first machine and controlling the virtual machine. The instructions, when executed by a computer, cause the computer to perform inquiring of a second machine about a memory usage status of virtual machines realized on the second machine; selecting a virtual machine capable of being swapped for a virtual machine realized on the first machine from among the virtual machines realized on the second machine based on information obtained at the inquiring; and swapping the virtual machine realized on the first machine for the virtual machine selected at the selecting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a schematic diagram illustrating a case in which a memory shortage occurs in a virtual machine according to the present embodiment of the present invention;

FIG. 1B is a schematic diagram illustrating a case of generating a free space;

FIG. 1C is a schematic diagram illustrating a case of performing swapping;

FIG. 1E is a schematic diagram illustrating a case in which memory allocation is completed;

FIG. 2 is a block diagram illustrating a configuration of a machine depicted in FIG. 1A;

FIG. 3 is a schematic diagram illustrating a configuration of a virtual-machine control program;

FIG. 6 is a flowchart for explaining a process performed by a virtual-machine control process as depicted in FIG. 1A, in which the virtual-machine control program as depicted in FIG. 3 becomes an execution state, when the virtual-machine control process detects the memory shortage of a virtual machine; and FIG. 7 is a flowchart for explaining a swapping target selecting process.

DESCRIPTION OF EMBODIMENTS

Figure 1D:
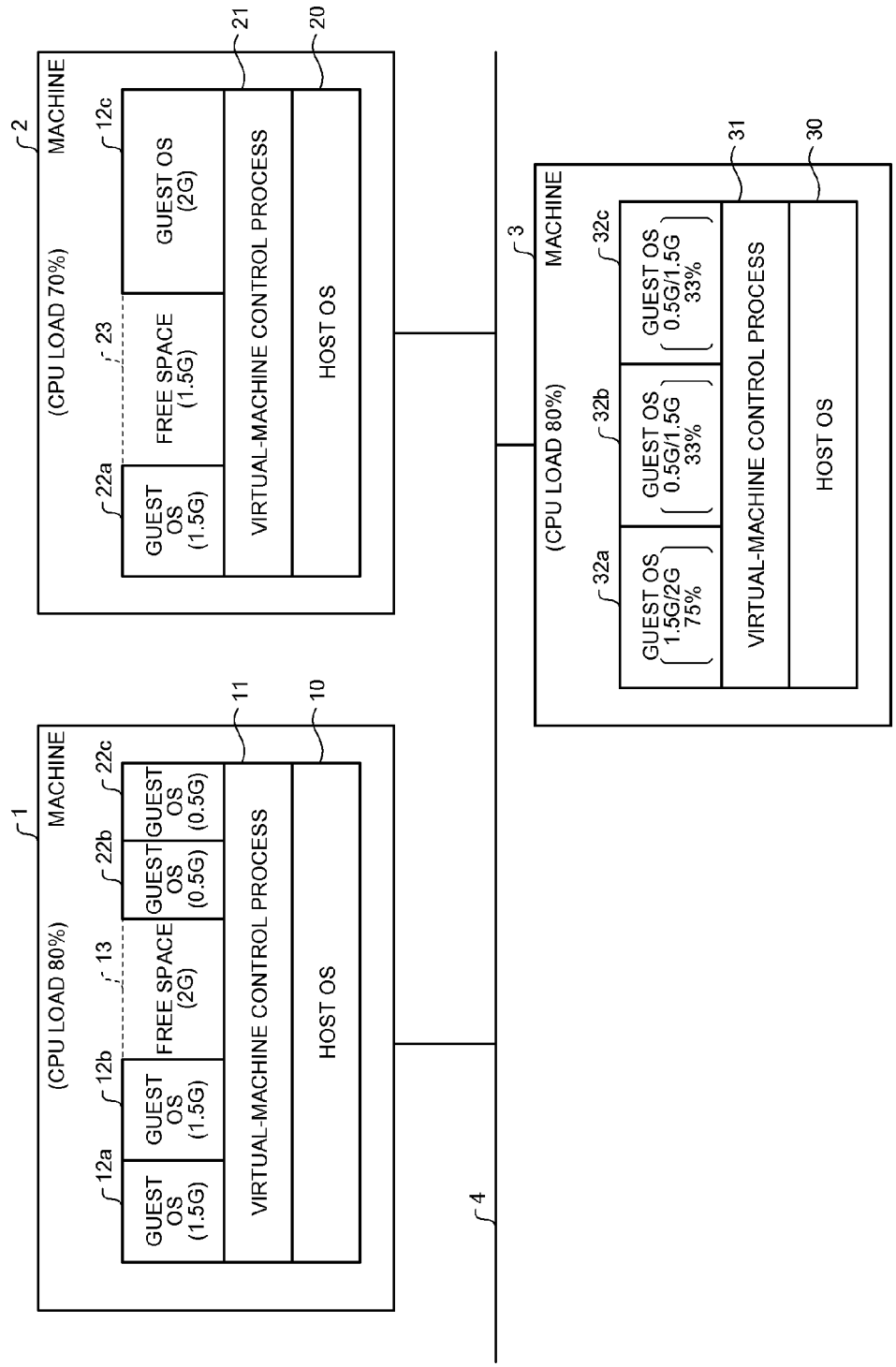
FIG. 1D is a schematic diagram illustrating a case in which movement of the virtual machines is completed.

Preferred embodiments of a virtual-machine control program, a virtual-machine control system, and a virtual-machine moving method according to the present invention will be explained below in detail with reference to the accompanying drawings. The present invention is not limited to the embodiments explained below.

First, a summary of the virtual-machine moving method according to the present embodiment is explained with a specific example. The virtual-machine moving method according to the present embodiment enables to move a virtual machine between machines without preparing a free space on a memory in advance by swapping the virtual machine for a virtual machine on another machine.

FIG. 1A is a schematic diagram illustrating a case in which a memory shortage occurs in the virtual machine. As depicted in FIG. 1A, in this example, three machines 1 to 3 are connected to a network 4. The machines 1 to 3 operate as a virtual-machine control system that operates a virtual machine on a local machine.

The machine 1 operates a virtual-machine control process 11 on a host operating system (OS) 10 and further operates guest OSs 12a to 12c on virtual machines realized by the virtual-machine control process 11, and the CPU load of the machine 1 is 90%. The virtual-machine control process 11 is a process that realizes a virtual machine and performs various controls necessary for operating the guest OS on the virtual machine.

The virtual machine that operates the guest OS 12a and the virtual machine that operates the guest OS 12b each use 1.5 giga bytes (GB) of an allocated 2 GB memory, so that the memory usage rate thereof is 75%. The virtual machine that operates the guest OS 12c uses 2 GB of an allocated 2 GB memory, so that the memory usage rate thereof is 100%.

Because a high-load process is performed in the guest OS 12c, the CPU load of the machine 1 is as high as 90%.

The machine 2 operates a virtual-machine control process 21, which is similar to the virtual-machine control process 11, on a host OS 20 and further operates guest OSs 22a to 22c on virtual machines realized by the virtual-machine control process 21, and the CPU load of the machine 2 is 60%. The virtual machine that operates the guest OS 22a uses 1.5 GB of an allocated 2 GB memory, so that the memory usage rate thereof is 75%. The virtual machine that operates the guest OS 22b and the virtual machine that operates the guest OS 22c each use 0.5 GB of an allocated 1.5 GB memory, so that the memory usage rate thereof is 33%.

The machine 3 operates a virtual-machine control process 31, which is similar to the virtual-machine control process 11, on a host OS 30 and further operates guest OSs 32a to 32c on virtual machines realized by the virtual-machine control process 31, and the CPU load of the machine 3 is 80%. The virtual machine that operates the guest OS 32a uses 1.5 GB of an allocated 2 GB memory, so that the memory usage rate thereof is 75%. The virtual machine that operates the guest OS 32b and the virtual machine that operates the guest OS 32c each use 0.5 GB of an allocated 1.5 GB memory, so that the memory usage rate thereof is 33%.

In this example, the memory usage rate of the virtual machine that operates the guest OS 12c is 100%, so that the virtual machine is in a memory shortage state. When the virtual-machine control process 11 detects the memory shortage of the virtual machine that operates the guest OS 12c, the virtual-machine control process 11 requests the virtual-machine control processes 21 and 31 to transmit operational status information. The operational status information is information including at least a load of a machine, and memory allocation size and memory usage size of each virtual machine.

When the virtual-machine control process 11 receives the operational status information from the virtual-machine control processes 21 and 31, the virtual-machine control process 11 determines a virtual machine to be swapped for the virtual machine that operates the guest OS 12c. The swapping target is a single virtual machine or a combination of a plurality of virtual machines.

The selection of the swapping target is performed while prioritizing a virtual machine, which is operated on a low-load machine and of which memory usage rate is low, or a combination of such virtual machines for leveling the resources. Based on such standard, in this example, a combination of the virtual machine that operates the guest OS 22b and the virtual machine that operates the guest OS 22c is selected as the swapping target.

FIG. 1B is a schematic diagram illustrating a case of generating a free space. After selecting the swapping target, the virtual-machine control process 11 collects unused memory from each virtual machine realized by itself and generates a free space for moving the virtual machines as the swapping target. In this example, the virtual-machine control process 11 collects memory of 0.5 GB from each of the virtual machine that operates the guest OS 12a and the virtual machine that operates the guest OS 12b to generate a free space 13 of 1 GB.

Moreover, the virtual-machine control process 11 requests the machine 2 on which the virtual machines as the swapping target present to collect unused memory from each virtual machine to generate a free space for moving the virtual machine that operates the guest OS 12c. In this example, the virtual-machine control process 21 collects memory of 0.5 GB from the virtual machine that operates the guest OS 22a and memory of 1 GB from each of the virtual machine that operates the guest OS 22b and the virtual machine that operates the guest OS 22c to generate a free space 23 of 2.5 GB, according to the request from the virtual-machine control process 11.

FIG. 1C is a schematic diagram illustrating a case of performing the swapping. After the free spaces are generated by the machines 1 and 2, the virtual-machine control process 11 moves the virtual machine that operates the guest OS 12c to the free space 23 generated in the machine 2. In parallel with this, the virtual-machine control process 11 requests the virtual-machine control process 21 to move the virtual machine that operates the guest OS 22b and the virtual machine that operates the guest OS 22c to the free space 13 generated in the machine 1. The virtual machines are moved without stopping the virtual machines by using the conventional hot migration technique.

FIG. 1D is a schematic diagram illustrating a case in which the movement of the virtual machines is completed. As depicted in FIG. 1D, after the movement of the virtual machines is completed, the size of the free space 13 becomes 2 GB and the size of the free space 23 becomes 1.5 GB. The virtual-machine control processes 11 and 21 allocate these unused memories to each virtual machine.

FIG. 1E is a schematic diagram illustrating a case in which the memory allocation is completed. In this example, the memory allocation is performed with the logic that the memory allocation size of the virtual machine that has presented prior to the swapping is returned to the state before the swapping and the remaining unused memory is allocated to the newly-moved virtual machine. The operational status of the machines 1 and 2 after performing the swapping is as follows.

On the virtual machines that are realized by the virtual-machine control process 11, the guest OSs 12a and 12b and the guest OSs 22b and 22c operate and the guest OS 12c that was performing a high-load process is moved out, so that the CPU load of the machine 1 is lowered to 80%. The virtual machine that operates the guest OS 12a and the virtual machine that operates the guest OS 12b each use 1.5 GB of the allocated 2 GB memory, so that the memory usage rate thereof is 75%. The virtual machine that operates the guest OS 22b and the virtual machine that operates the guest OS 22c each use 0.5 GB of the allocated 1 GB memory, so that the memory usage rate thereof is 50%.

On the virtual machines that are realized by the virtual-machine control process 21 of the machine 2, the guest OSs 22a and 12c operate. Because the guest OS 12c that performs a high-load process is moved in, the CPU load of the machine 1 is increased to 70%. The virtual machine that operates the guest OS 22a uses 1.5 GB of the allocated 2 GB memory, so that the memory usage rate thereof is 75%. The virtual machine that operates the guest OS 12c uses 2 GB of the allocated 3 GB memory, so that the memory usage rate thereof is 66%.

As described above, in the virtual-machine moving method according to the present embodiment, because a virtual machine in which the memory shortage occurs is swapped for one or a plurality of virtual machines on another machine, the memory shortage can be solved by moving the virtual machine in which the memory shortage occurs to another machine without preparing unused space in advance in the destination.

Furthermore, in the virtual-machine moving method according to the present embodiment, because a virtual machine with low memory usage rate or a combination thereof is selected as the swapping target, the memory usage rate of each virtual machine after the swapping is performed is leveled. Moreover, because a virtual machine that operates on a machine with low CPU load or a combination thereof is selected as the swapping target, the CPU load of each machine is also leveled.

Next, a system of starting the virtual-machine control process is explained with the case of the virtual-machine control process 11 as an example. FIG. 2 is a block diagram illustrating a configuration of the machine 1 depicted in FIG. 1A. As depicted in FIG. 2, the machine 1 is configured by connecting a CPU 110 that executes various arithmetic processes, an input device 120 that receives input of data from a user, a monitor 130 that displays various information, a medium reading device 140 that reads computer programs or the like from a recording medium, a network interface device 150 that performs transmission/reception of data with other computers via a network, a random access memory (RAM) 160 that temporarily stores therein various information, and a hard disk device (HDD) 170 with a bus 180.

The HDD 170 stores therein a virtual-machine control program 171. The CPU 110 reads the virtual-machine control program 171 from the HDD 170 and loads it to the RAM 160, whereby the virtual-machine control program 171 functions as the virtual-machine control process 11. This program may be recorded on a computer-readable storage medium such as a floppy disc (FD), a CD-ROM, an MO, and a DVD and executed by being read out from the storage medium by the CPU.

The virtual-machine control process 11 reads out a virtual-machine image data 172 stored in the HDD 170 and loads it to a space on a virtual storage allocated to itself, whereby a virtual machine is realized and the guest OS included in the virtual-machine image data 172 is started thereon.

The OS that is started starts an application included in the virtual-machine image data 172 to start to provide various services. The virtual-machine control process 11 performs various controls necessary for operating the guest OS or the application started from the guest OS on the virtual machine.

Next, a configuration of the virtual-machine control program 171 depicted in FIG. 2 is explained. FIG. 3 is a schematic diagram illustrating the configuration of the virtual-machine control program 171. In FIG. 3, the configuration that has no relationship with the swapping of virtual machines is not depicted for simplifying the explanation.

As depicted in FIG. 3, the virtual-machine control program 171 includes a keep alive unit 171a, an operational-status monitoring unit 171b, an operational-status inquiry unit 171c, a swapping-target selecting unit 171d, a memory-allocation adjusting unit 171e, a memory-allocation-adjustment requesting unit 171f, a swapping performing unit 171g, a load status table 171h, and a memory allocation status table 171i.

The keep alive unit 171a is a process unit that finds a virtual-machine control process in operation by exchanging a keep alive packet with other virtual-machine control processes and monitors the startup status of the found virtual-machine control process. The keep alive unit 171a registers the newly-found virtual-machine control process in the load status table 171h and sets the status of each virtual-machine control process registered in the load status table 171h in the load status table 171h.

Figure 4:
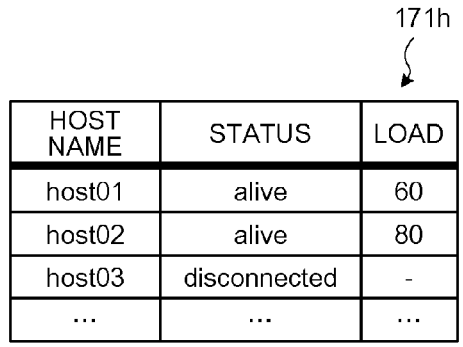
FIG. 4 is a schematic diagram illustrating one example of a load status table when the virtual-machine control program is in execution state.

FIG. 4 is a schematic diagram illustrating one example of the load status table 171h when the virtual-machine control program 171 is in execution state. As depicted in FIG. 4, the load status table 171h includes items such as a host name, a status, and a load, which are registered in a row for each virtual-machine control process found by the keep alive unit 171a.

The host name is an item in which a host name of a machine on which a virtual-machine control process operates is set. The status is an item in which a current status of a virtual-machine control process is set, and any of values of "alive" and "disconnected" is set. "alive" indicates that the virtual-machine control process operates normally, and "disconnected" indicates that the communication with the virtual-machine control process is impossible.

The load is an item in which the CPU load of a machine on which a virtual-machine control process operates is set by the operational-status inquiry unit 171c. As the load of a machine on which a virtual-machine control process operates, a disk input/output size, a network traffic, or the like can also be used other than the CPU load.

The operational-status monitoring unit 171b is a process unit that monitors the load of a machine on which the virtual-machine control process operates and the memory allocation size and the memory usage size of each virtual machine realized on the virtual-machine control process. Moreover, when there is an inquiry about the operational status of the virtual-machine control process from other virtual-machine control processes, the operational-status monitoring unit 171b responds to them with a monitored content.

The operational-status inquiry unit 171c is a process unit that inquires of other virtual-machine control processes about the operational status when the memory shortage of a virtual machine that is realized on the virtual-machine control process is detected by the operational-status monitoring unit 171b. The operational-status inquiry unit 171c inquires of a virtual-machine control process of which value in the status is "alive" in the load status table 171h, sets the load of a machine included in the response in the load status table 171h, and sets the memory usage status in the memory allocation status table 171i.

Figure 5:
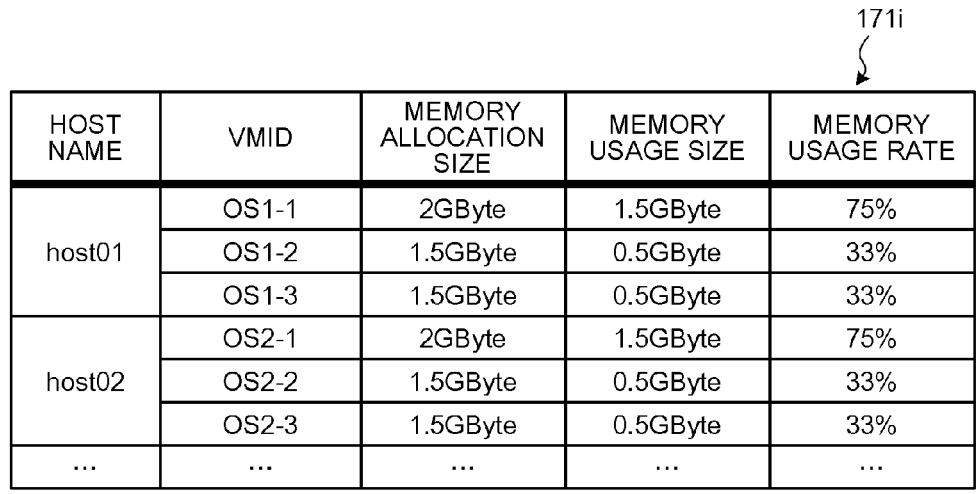
FIG. 5 is a schematic diagram illustrating one example of a memory allocation status table after inquiry by an operational-status inquiry unit as depicted in FIG. 3.

FIG. 5 is a schematic diagram illustrating one example of the memory allocation status table 171i after the inquiry by the operational-status inquiry unit 171c. As depicted in FIG. 5, the memory allocation status table 171i includes items such as a host name, a virtual machine identifier (VMID), a memory allocation size, a memory usage size, and a memory usage rate, which are registered in a row for each virtual machine operated on a virtual-machine control process.

The host name is an item in which a host name of a machine on which a virtual-machine control process operates is set. The VMID is an item in which an identification number of a virtual machine realized on a virtual-machine control process is set. The memory allocation size is an item in which the memory size allocated to the virtual-machine control process is set. The memory usage size is an item in which the size of a memory that the virtual machine currently uses is set. The memory usage rate is an item in which the memory usage rate of the virtual machine that is calculated from the memory allocation size and the memory usage size is set.

The swapping-target selecting unit 171d is a process unit that selects a virtual machine as a target to be swapped for the virtual machine in which the memory shortage occurs based on the result of the inquiry by the operational-status inquiry unit 171c. The swapping target can be a single virtual machine or a combination of a plurality of virtual machines. The swapping-target selecting unit 171d selects a virtual machine, which is operated on a low-load machine and of which memory usage rate is low, or a combination of such virtual machines as the swapping target for leveling the resources.

The memory-allocation adjusting unit 171e is a process unit that collects unused memory from each virtual machine to generate a free space for performing the swapping of virtual machines. The memory-allocation adjusting unit 171e performs the similar process when there is a request for generating a free space from other virtual-machine control processes. Moreover, the memory-allocation adjusting unit 171e performs a process of allocating a free space to each virtual machine after the swapping of the virtual machines is completed.

The memory-allocation-adjustment requesting unit 171f is a process unit that requests generation of a free space necessary for performing the swapping of virtual machines to a virtual-machine control process that realizes the virtual machine as the swapping target. The swapping performing unit 171g is a process unit that performs a process of moving the virtual machine to the swapping destination.

Next, a procedure of the virtual-machine control program 171 is explained. FIG. 6 is a flowchart for explaining a process performed by the virtual-machine control process 11, in which the virtual-machine control program 171 becomes an execution state, when the virtual-machine control process 11 detects the memory shortage of a virtual machine.

As depicted in FIG. 6, when the memory shortage of a virtual machine is detected by the operational-status monitoring unit 171b (Step S101), the operational-status inquiry unit 171c refers to the load status table 171h and inquires of other virtual-machine control processes of which status is "alive" about the load status and the memory usage status of each virtual machine (Step S102).

The virtual-machine control processes that received the inquiry respond to the inquiry source with the load status of machines on which they are operated and the memory allocation size and the memory usage size of each virtual machine that is realized by themselves (Step S201). After the operational-status inquiry unit 171c receives all responses and stores the content thereof in the load status table 171h and the memory allocation status table 171i, the swapping-target selecting unit 171d performs a swapping target selecting process to be described below to select the swapping target for the virtual machine in which the memory shortage occurs (Step S103).

If the swapping-target selecting unit 171d cannot find the swapping target (No at Step S104), the process from Step S102 is restarted after the elapse of a predetermined standby time. On the other hand, if the swapping-target selecting unit 171d can find the swapping target (Yes at Step S104), the memory-allocation-adjustment requesting unit 171f requests the virtual-machine control process that realizes the virtual machine as the swapping target to collect unused memory from each virtual machine to generate a free space (Step S105), and the memory-allocation adjusting unit 171e collects unused memory from each virtual machine realized by the virtual-machine control process to generate a free space (Step S106).

The virtual-machine control process requested to generate the free space collects the unused memory from each virtual machine realized by itself to generate the free space (Step S202), and thereafter responds that the generation of the free space is completed (Step S203). In this manner, after the free space is generated, both virtual-machine control processes perform the swapping process of mutually moving the virtual machines as the target to the opposing free space (Steps S107 and S204) and after the swapping process is completed, reallocate the memory of the free space to each virtual machine (Steps S108 and S205).

FIG. 7 is a flowchart for explaining the swapping-target selecting process. As depicted in FIG. 7, the swapping target selecting unit 171d obtains the memory usage status of each virtual machine from the operational-status monitoring unit 171b and calculates a total of unused memory of each virtual machine, thereby obtaining the size of a free space that can be ensured by the virtual-machine control process (Step S301).

Then, the virtual-machine control process is selected one by one in ascending order of the load by referring to the load status table 171h (Step S302). Every time when one virtual-machine control process is selected (No at Step S303), the total of unused memory of each virtual machine realized by the selected virtual-machine control process is calculated by referring to the memory allocation status table 171i to obtain the size of a free space that can be ensured by the opposing virtual-machine control process (Step S304).

If the free space that can be ensured by the opposing virtual-machine control process is smaller than the memory usage size of the virtual machine on which the memory shortage is detected, that is, if the virtual machine on which the memory shortage is detected cannot be transferred to the opposing side (No at Step S305), the swapping-target selecting unit 171d returns to Step S302 and attempts to select the next virtual-machine control process.

On the other hand, if the virtual machine on which the memory shortage is detected can be transferred to the opposing side (Yes at Step S305), the swapping-target selecting unit 171d generates all combinations of the virtual machines realized by the selected virtual-machine control process (Step S306). The combinations of the virtual machines to be generated include one consisting of a single virtual machine. For example, in the example of the memory allocation status table 171i depicted in FIG. 5, if the virtual-machine control process that operates on the machine with the host name "host 01" is selected as the opposing side, the following seven combinations are generated:

OS1-1,
OS1-2,
OS1-3,
OS1-1 and OS1-2,
OS1-1 and OS1-3,
OS1-2 and OS1-3, and
OS1-1, OS1-2, and OS1-3.

Then, the swapping-target selecting unit 171d calculates the memory allocation size, the memory usage size, and the memory usage rate in units of the generated combination (Step S307). The combination is selected one by one in ascending order of the memory usage rate (Step S308). If the memory usage size of the selected combination is smaller than the free space that can be ensured by the virtual-machine control process, that is, if the selected combination can be transferred to the free space that can be ensured by the virtual-machine control process (Yes at Step S310), the selected combination is selected as the swapping target and the process ends (Step S311).

If there is no combination that can be transferred to the free space that can be ensured by the virtual-machine control process (Yes at Step S309), the swapping-target selecting unit 171d returns to Step S302 and attempts to select the next virtual-machine control process.

At Step S302, if all the virtual-machine control processes have been selected (Yes at Step S303), the swapping-target selecting unit 171d determines that the swapping is impossible and the process ends (Step S312).

As described above, in the present embodiment, a virtual machine that can be swapped for a virtual machine on the machine is selected based on the memory usage status of virtual machines obtained from another machine, and the virtual machine on the machine is swapped for the selected virtual machine, so that the virtual machine can be moved to another machine without preparing a free space in advance.

In the above embodiment, an example is given in which a virtual machine is swapped with the memory shortage of the virtual machine as a trigger; however, a virtual machine can be swapped with a shortage of other resources, such as a shortage of a CPU processing power and a shortage of a band of a network, as a trigger. Moreover, in the above embodiment, an example is given in which virtual machines to be swapped have a one-to-one correspondence or a one-to-many correspondence; however, the virtual machines to be swapped can have a many-to-many correspondence or a many-to-one correspondence.

Furthermore, in the above embodiment, an example is given in which a free space for the swapping is generated by collecting unused memory from virtual machines; however, if a free space with a size necessary for the swapping cannot be generated only by collecting unused memory, memory in use can further be collected from virtual machines at a constant rate.

According to one aspect of the present invention, a virtual machine can be moved to another machine without preparing a free space in advance.

Moreover, according to another aspect of the present invention, a memory usage size of each virtual machine after performing swapping is leveled, so that a memory can be used efficiently.

Furthermore, according to still another aspect of the present invention, a virtual machine can be moved to another machine without preparing a free space in advance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable medium storing a program containing instructions for realizing a virtual machine on a first machine and controlling the virtual machine, the program causing a computer to execute a procedure, the procedure comprising:
   inquiring of a second machine about a memory usage status of virtual machines realized on the second machine;
   selecting a second virtual machine capable of being swapped for a first virtual machine realized on the first machine from among the virtual machines realized on the second machine based on information obtained at the inquiring; and
   when a second free space size in the second machine is not smaller than a first memory usage size of the first virtual machine and a first free space size in the first machine is not smaller than a second memory usage size of the second virtual machine, performing a swap process that makes the first machine move the first virtual machine into the second machine and makes the second machine move the second virtual machine into the first machine through a migration, wherein:
   the selecting further includes inquiring of the second machine about a load of the second machine and selecting a virtual machine that is realized on a machine with low load as a priority, as the second virtual machine, and the program does not cause the computer to perform the swap process when the second free space size is smaller than the first memory usage size or the first free space size is smaller than the second memory usage size.

2. The non-transitory computer-readable medium according to claim 1, wherein the selecting includes selecting a virtual machine with low memory usage rate as a priority, as the second virtual machine.

3. A virtual-machine control apparatus that realizes a virtual machine on a first machine and controls the virtual-machine, the virtual machine control apparatus comprising:
   a memory; and
   a processor coupled to the memory,
   wherein the processor executes a process comprising:
   inquiring of a second machine about a memory usage status of virtual machines realized on the second machine;
   selecting a second virtual machine capable of being swapped for a first virtual machine realized on the first machine from among the virtual machines realized on the second machine based on information obtained at the inquiring; and
   when a second free space size in the second machine is not smaller than a first memory usage size of the first virtual machine and a first free space size in the first machine is not smaller than a second memory usage size of the second virtual machine, performing a swap process that makes the first machine move the first virtual machine into the second machine and makes the second machine move the second virtual machine into the first machine through a migration, wherein:
   the selecting further includes inquiring of the second machine about a load of the second machine and selecting a virtual machine that is realized on a machine with low load as a priority, as the second virtual machine, and the processor does not execute performing the swap process when the second free space size is smaller than the first memory usage size or the first free space size is smaller than the second memory usage size.

4. The virtual-machine control apparatus according to claim 3, wherein the selecting includes selecting a virtual machine with low memory usage rate as a priority, as the second virtual machine.

5. A virtual-machine moving method performed in a virtual-machine control system that realizes a virtual machine on a first machine, the virtual-machine moving method comprising:
   inquiring of a second machine about a memory usage status of virtual machines realized on the second machine;
   selecting a second virtual machine capable of being swapped for a first virtual machine realized on the first machine from among the virtual machines realized on the second machine based on information obtained at the inquiring; and
   when a second free space size in the second machine is not smaller than a first memory usage size of the first virtual machine and a first free space size in the first machine is not smaller than a second memory usage size of the second virtual machine, performing a swap process that makes the first machine move the first virtual machine into the second machine and makes the second machine move the second virtual machine into the first machine through a migration, wherein:
   the selecting further includes inquiring of the second machine about a load of the second machine and selecting a virtual machine that is realized on a machine with low load as a priority, as the second virtual machine, and the swap process is not performed when the second free space size is smaller than the first memory usage size or the first free space size is smaller than the second memory usage size.

6. The virtual-machine moving method according to claim 5, wherein the selecting includes selecting a virtual machine with low memory usage rate as a priority, as the second virtual machine.

7. A non-transitory computer-readable medium storing a program containing instructions for realizing a virtual machine on a first machine and controlling the virtual machine, the program causing a computer to execute a procedure, the procedure comprising:

inquiring of a second machine about a memory usage status of virtual machines realized on the second machine:

selecting a second virtual machine capable of being swapped for a first virtual machine realized on the first machine from among the virtual machines realized on the second machine based on information obtained at the inquiring; and when a second free space size in the second machine is not smaller than a first memory usage size of the first virtual machine and a first free space size in the first machine is not smaller than a second memory usage size of the second virtual machine, performing a swap process that makes the first machine move the first virtual machine into the second machine and makes the second machine move the second virtual machine into the first machine through a migration, wherein:

the program further causes the computer to perform collecting an unused memory from the first virtual machine to generate a free space for moving the second virtual machine on a memory space, and the program does not cause the computer to perform the swap process when the second free space size is smaller than the first memory usage size or the first free space size is smaller than the second memory usage size.

8. The non-transitory computer-readable medium according to claim 7, wherein, when the free space for moving the second virtual machine cannot be generated on the memory space even by collecting the unused memory from the first virtual machine, the collecting includes further collecting a memory in use from the first virtual machine to generate the free space.

9. A virtual-machine control apparatus that realizes a virtual machine on a first machine and controls the virtual-machine, the virtual machine control apparatus comprising:

a memory; and a processor coupled to the memory, wherein the processor executes a process comprising:

inquiring of a second machine about a memory usage status of virtual machines realized on the second machine;

selecting a second virtual machine capable of being swapped for a first virtual machine realized on the first machine from among the virtual machines realized on the second machine based on information obtained at the inquiring; and when a second free space size in the second machine is not smaller than a first memory usage size of the first virtual machine and a first free space size in the first machine is not smaller than a second memory usage size of the second virtual machine, performing a swap process that makes the first machine move the first virtual machine into the second machine and makes the second machine move the second virtual machine into the first machine through a migration, wherein:

the processor further executes collecting an unused memory from the first virtual machine to generate a free space for moving the second virtual machine on a memory space, and the processor does not execute performing the swap process when the second free space size is smaller than the first memory usage size or the first free space size is smaller than the second memory usage size.

10. The virtual-machine control apparatus according to claim 9 wherein, when the free space for moving the second virtual machine selected cannot be generated on the memory space even by collecting the unused memory from the first virtual machine, the collecting includes further collecting a memory in use from the first virtual machine to generate the free space.

11. A virtual-machine moving method performed in a virtual-machine control system that realizes a virtual machine on a first machine, the virtual-machine moving method comprising:

inquiring of a second machine about a memory usage status of virtual machines realized on the second machine;

selecting a second virtual machine capable of being swapped for a first virtual machine realized on the first machine from among the virtual machines realized on the second machine based on information obtained at the inquiring;

when a second free space size in the second machine is not smaller than a first memory usage size of the first virtual machine and a first free space size in the first machine is not smaller than a second memory usage size of the second virtual machine, performing a swap process that makes the first machine move the first virtual machine into the second machine and makes the second machine move the second virtual machine into the first machine through a migration; and collecting an unused memory from the first virtual machine to generate a free space for moving the second virtual machine on a memory space.

wherein the swap process is not performed when the second free space size is smaller than the first memory usage size or the first free space size is smaller than the second memory usage size.

12. The virtual-machine moving method according to claim 11, wherein, when the free space for moving the second virtual machine cannot be generated on the memory space even by collecting the unused memory from the first virtual machine, the collecting includes further collecting a memory in use from the first virtual machine to generate the free space.

* * * * *